(No Model.)
R. PAXSON.
CHAIN.
No. 447,620.  Patented Mar. 3, 1891.
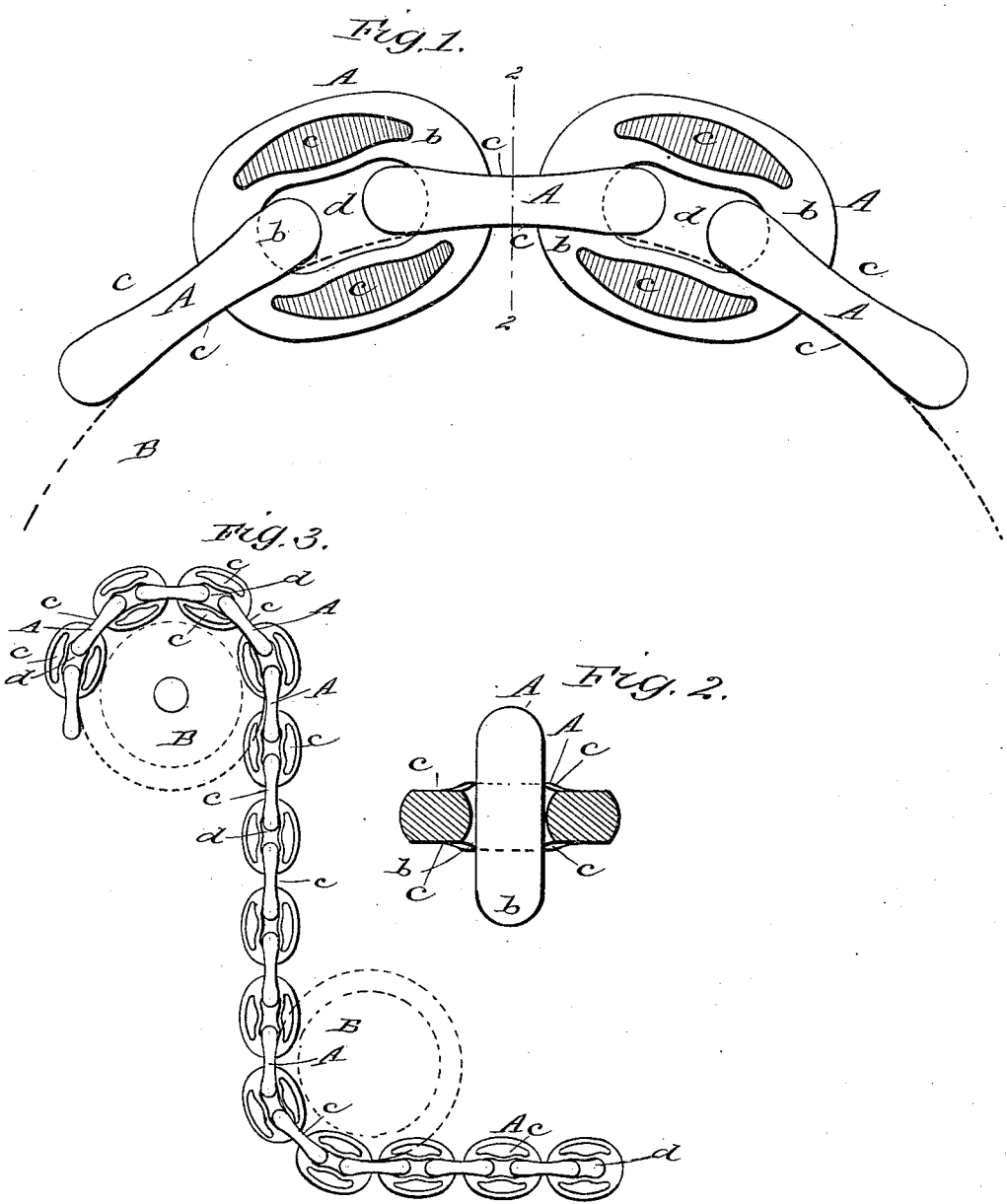
WITNESSES:
INVENTOR:
R. Paxson
BY Munn & Co
ATTORNEYS

UNITED STATES PATENT OFFICE.

RICHARD PAXSON, OF PHILADELPHIA, PENNSYLVANIA.

CHAIN.

SPECIFICATION forming part of Letters Patent No. 447,620, dated March 3, 1891.

Application filed November 12, 1890. Serial No. 371,164. (No model.)

*To all whom it may concern:*

Be it known that I, RICHARD PAXSON, of the city and county of Philadelphia and State of Pennsylvania, have invented new and useful Improvements in Chains, of which the following is a full, clear, and exact description.

This invention relates to cable-chains—such, for instance, as are used on cranes for raising and lowering heavy weights, and for other machines or purposes—that is, chains in which the links cross each other or are successively or alternately in planes at right angles to each other, in contradistinction to belt-chains, in which the links are pivoted to each other and lie in like planes throughout the length of the chain, and which cannot be advantageously used for the same purposes as cable-chains.

Ordinarily these cable-chains, which are made up of oval-like links crossing each other, as described, have their opposite faces made straight or parallel on their opposite sides, so that in passing around sheaves or drums their alternate links, which form the bearing ones on the peripheral portion of the drum, are subjected to a transverse or bending strain in the middle of their length only, in addition to the tension put upon them in direction of their length by the weight or load such chains are used to raise or lower. This transverse or bending strain is due to the alternate links bearing at one point only, as it were, on the peripheral portion of the sheave or drum, and the abrasion being confined to such part or place produces a rapid wear of the links. To decrease this transverse or bending strain, which increases as the diameter of the sheave or drum decreases, the sheaves or drums are usually made of an enlarged diameter, which adds to the space occupied, increases cost and weight of materials, and adds to the labor or power necessary to operate the crane or machine. Again, in passing such chains over sheaves or pulleys which change the direction of its run, so as to present opposite faces of the links to contact with the peripheral portions of the sheaves or drums, a reverse bending action or strain takes place on the links, and this repeatedly occurring causes breakage of the links at their bearing point or part and the life of the chain is shortened, the fibers giving way under such repeated reverse transverse bending strains.

My invention consists in an open-link chain of the description above referred to, having its links of special construction on their reverse faces and on opposite sides of each face, substantially as hereinafter described, and more particularly pointed out in the claims, whereby the defects and objections hereinbefore named are removed.

Reference is to be had to the accompanying drawings, forming a part of this specification, in which similar letters of reference indicate corresponding parts in all the figures.

Figure 1 represents a longitudinal view of a section or portion of my improved chain as arranged to travel over a sheave or drum, shown only in part by dotted lines. Fig. 2 is a transverse section of such chain upon the line 2 2 in Fig. 1; and Fig. 3 is a view showing such chain as arranged to pass around sheaves or drums, which change the direction in run of the chain and alternate the bearing-surfaces to opposite faces of the link.

A A are the links of the chain, and B B the recessed or grooved sheaves or drums around which such chain passes. These links A A, which are open ones and of ordinary oval-like contour on their faces, so as to engage with one another in planes at right angles to each other successively, as cable-chains are usually constructed, are not made straight on opposite sides $b\ b$ of their reverse faces as customary in such chains, but are constructed with concave surfaces $c\ c$ in direction of the length of the links on said reverse faces, upon opposite sides of either face—that is, on opposite sides of the opening $d$ in the links. These curved or concave portions $c\ c$ conform, or approximately so, to the peripheral portions of the sheave or drum or sheaves or drums over which they work and on which such links as have a face presentation bear or make contact. By this construction the bearing-links have a bearing nearly throughout their whole length on each side of the opening in them, upon their face which is in contact, upon the peripheral portion of the sheave or drum. This not only greatly reduces wear of the links by distributing over an extended surface the frictional contact of their bearing with the peripheral portion of the sheave or drum, as distinguished from touching only in the middle of their length, and admits of sheaves or pulleys of reduced diameter, cost, and weight being used; but by the concave construction of the bearing-surfaces of the links transverse or bending strain is removed from the links, both when the chain passes only over a single sheave, as shown in Fig. 1, or over more than one sheave, to change the direction in run of the chain, as shown in Fig. 3, for instance, and in which latter all tendency to a reverse transverse strain or bend, as occurs when the links are straight on their bearing-surfaces, is done away with, and thus the durability and life of the chain is augmented.

As hereinbefore observed, an open chain having its succeeding links cross one another, as described, forms a different article, both commercially and otherwise, and is applicable to different purposes or uses than a belt-chain composed of close links lying in one and the same plane and pivoted together, and even where the links of the latter chain have been made with concave surfaces on their opposite sides or edges such necessitates the turning of the chain half-round to change its operation from one of its sides to the other over a sheave or drum, by reason of all the links lying in the same plane, whereas the chain shown in the drawings only requires to be turned a quarter-round to reverse its bearing surfaces on or over one and the same sheave or drum by reason of the crossing of its successive links. Hence my improvement is not designed to cover a chain having all its links in the same plane and pivoted together.

Having thus described my invention, what I claim as new, and desire to secure by Letters Patent, is—

1. As a new article of manufacture, a chain having links crossing each other, as described, constructed with concave bearing-surfaces on the faces of the links, substantially as and for the purposes specified.

2. An open-link chain having its succeeding links in different planes and crossing one another, constructed with concave bearing-surfaces on opposite faces of the links upon opposite sides of the opening through the links, essentially as shown and described, and for the purposes herein set forth.

RICHARD PAXSON.

Witnesses:
J. R. MASSEY,
FRANK R. JORDAN.